US010489534B1

(12) United States Patent
Ramabadran

(10) Patent No.: US 10,489,534 B1
(45) Date of Patent: Nov. 26, 2019

(54) SUPPORT FOR MULTIPLE USER DEFINED ASSERTION CHECKERS IN A MULTI-FPGA PROTOTYPING SYSTEM

(71) Applicant: Cadence Design Systems, Inc., San Jose, CA (US)

(72) Inventor: Vasant Ramabadran, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/359,071

(22) Filed: Mar. 20, 2019

Related U.S. Application Data

(62) Division of application No. 15/698,084, filed on Sep. 7, 2017, now Pat. No. 10,282,501.

(51) Int. Cl.
*G06F 17/50* (2006.01)
*H03K 19/177* (2006.01)

(52) U.S. Cl.
CPC ...... *G06F 17/5027* (2013.01); *G06F 17/5054* (2013.01); *G06F 17/5077* (2013.01); *H03K 19/17736* (2013.01)

(58) Field of Classification Search
CPC .... G06G 11/36; G06G 21/76; G06G 17/5027; G06G 17/5054; G06G 15/7828; G06G 15/7864; G06G 2213/0038; G06F 11/36; G06F 21/76; G06F 17/5027; G06F 17/5054; G06F 15/7828; G06F 15/7864; G06F 2213/0038
USPC ............................ 703/21; 716/106, 128, 138
See application file for complete search history.

(56) References Cited

U.S. PATENT DOCUMENTS

2003/0144828 A1* 7/2003 Lin .................... G06F 15/7864 703/21
2006/0074622 A1 4/2006 Scott et al.
2006/0184350 A1 8/2006 Huang et al.
2013/0227509 A1 8/2013 Chang et al.

* cited by examiner

*Primary Examiner* — Paul Dinh
(74) *Attorney, Agent, or Firm* — McDermott Will & Emery LLP

(57) ABSTRACT

A method is provided that includes selecting an assertion checker for a design under test. The design under test includes hardware and firmware for a system on a chip, the method including instantiating the assertion checker in a compilation file, annotating the compilation file to define an assertion control signal for the assertion checker, and selecting one of a DISABLE or an ENABLE definition for the assertion control signal. The method also includes configuring a clock in a prototyping platform to stop when the assertion control signal is enabled in the assertion checker and a logic condition for the assertion control signal is satisfied in the prototyping platform. A system and a computer readable medium including instructions to perform the above method are also provided.

10 Claims, 7 Drawing Sheets

SUPPORT FOR MULTIPLE USER DEFINED ASSERTION CHECKERS IN A MULTI-FPGA PROTOTYPING SYSTEM

CROSS-REFERENCE TO RELATED APPLICATIONS

This application is a divisional application of U.S. patent application Ser. No. 15/698,084 entitled "SUPPORT FOR MULTIPLE USER DEFINED ASSERTION CHECKERS IN A MULTI-FPGA PROTOTYPING SYSTEM," and filed on Sep. 7, 2017, the disclosure of which is hereby incorporated by reference in its entirety.

TECHNICAL FIELD

Embodiments described herein are generally related to the field of prototype testing in circuit design applications. More specifically, embodiments described herein are related to methods for performing field programmable gate array prototyping of a system on a chip (SoC) design.

BACKGROUND

To test the capabilities and limitations of current SoCs, prototyping is a widely used technique. SoCs include complex circuitry (hardware) and control firmware, and prototyping techniques have been developed to verify hardware and software behavior and detect bugs, loopholes and other error conditions in the firmware, under different stimulus and conditions, to test the performance of a SoC design, e.g., a design under test (DUT). For large SoCs including multiple repetitions of smaller portions of circuitry, some emulators may require multiple circuits operating in parallel, thus increasing computational cost, packaging and complexity of the SoC verification process. Prototyping tools using field-programmable gate arrays (FPGAs) may be better suited for these repetitive tasks. However, many prototyping tools sacrifice debug infrastructure and capabilities to achieve higher performance than that of a typical emulator.

The description provided in the background section should not be assumed to be prior art merely because it is mentioned in or associated with the background section. The background section may include information that describes one or more aspects of the subject technology.

SUMMARY

In certain aspects, a computer-implemented method is described that includes selecting an assertion checker for a design under test, the design under test including hardware and firmware for a system on a chip. The computer-implemented method further includes instantiating the assertion checker in a compilation file, annotating the compilation file to define an assertion control signal for the assertion checker, and selecting one of a DISABLE or an ENABLE definition for the assertion control signal. In some embodiments, the computer-implemented method also includes configuring a clock in a prototyping platform to stop when the assertion control signal is enabled in the assertion checker and a logic condition for the assertion control signal is satisfied in the prototyping platform.

In certain aspects, a system is described that includes a memory storing instructions, and at least one processor that executes the instructions to propagate a stimulus waveform through a field programmable gate array board configured to execute a sub-netlist in a partition of a design under test in a prototyping platform, to turn control of the prototyping platform to a runtime system when an assertion checker is fired in the field programmable gate array board, and to call a user registered handler function in the runtime system to perform a diagnostic test of the design under test. Then at least one processor further executes instructions to possibly correct a local hardware or software condition in the sub-netlist based on the diagnostic test, and to return control of the design under test to the prototyping platform.

In certain aspects, a non-transitory, machine-readable storage medium is described that includes machine-readable instructions for causing a processor to execute a method. The method includes propagating a stimulus waveform through a field programmable gate array board configured to execute a sub-netlist in a partition of a design under test in a prototyping platform, and turning control of the prototyping platform to a runtime system when an assertion checker is fired in the field programmable gate array board. The method further includes calling a user registered handler function in the runtime system to perform a variety of reporting and diagnostic tests of the design under test, correcting a local hardware or software condition in the sub-netlist based on the diagnostic test, returning control of the design under test to the prototyping platform, and providing a probe waveform resulting from the stimulus waveform that is propagated through the field programmable gate array board, to a user.

In certain aspects, a system is described including a means for storing computer code. The system further includes a means to execute the computer code for propagating a stimulus waveform through a field programmable gate array board configured to execute a sub-netlist in a partition of a design under test in a prototyping platform, and turning control of the prototyping platform to a runtime system when an assertion checker is fired in the field programmable gate array board. The means to execute the computer code further executes calling a user registered handler function in the runtime system to perform reporting, diagnostics and or possible corrections to local hardware or software condition in the sub-netlist based on the diagnostic test, returning control of the design under test to the prototyping platform, and providing a probe waveform resulting from the stimulus waveform that is propagated through the field programmable gate array board, to a user.

BRIEF DESCRIPTION OF THE DRAWINGS

In the figures, elements and steps denoted by the same or similar reference numerals are associated with the same or similar elements and steps, unless indicated otherwise.

DETAILED DESCRIPTION

Figure 1:
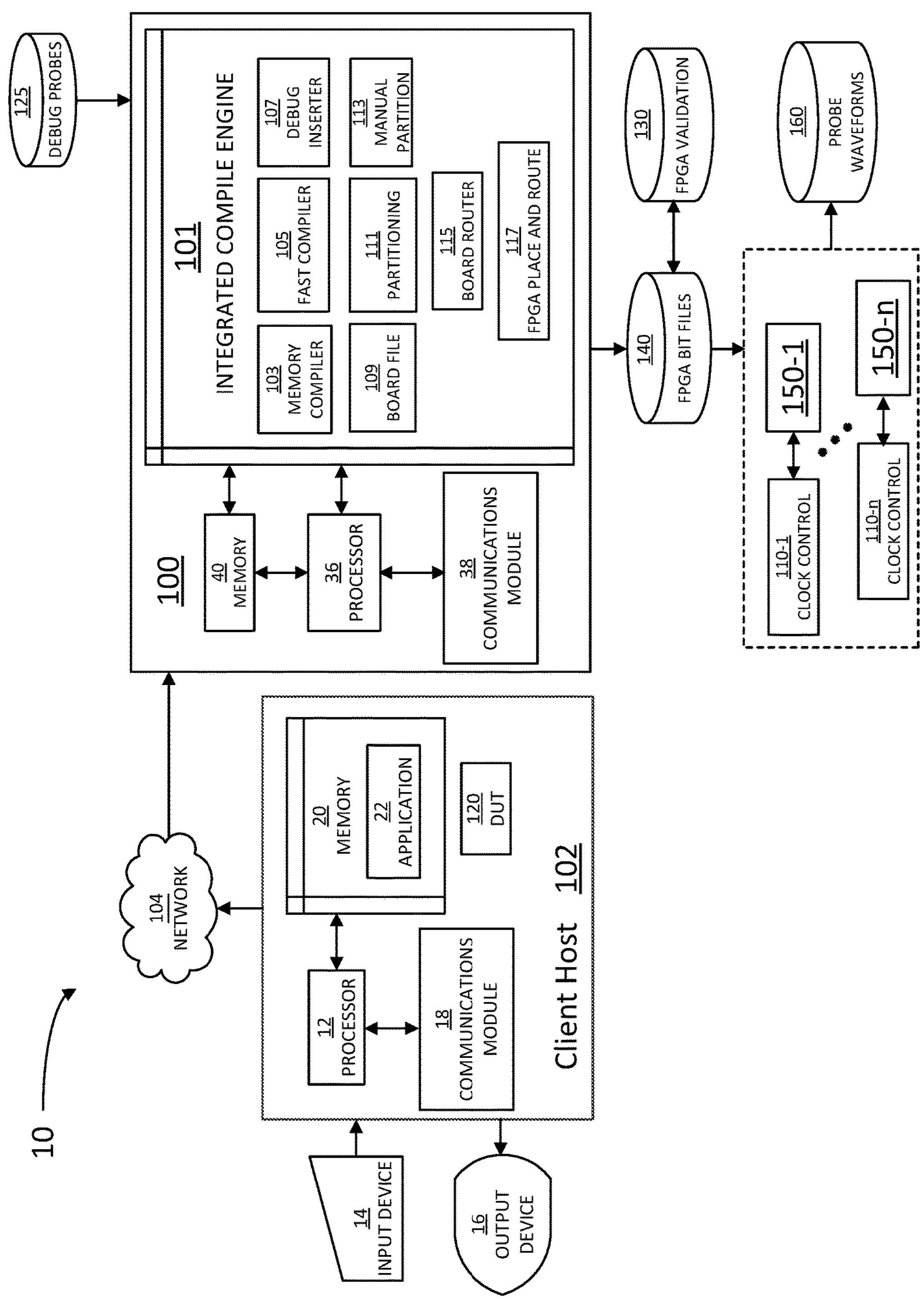
FIG. 1 illustrates a multi-FPGA prototyping platform for testing software and hardware in SoC designs, according to some embodiments.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

In some embodiments consistent with the present disclosure, FPGAs are used in prototyping and emulation platforms for SoCs. In some embodiments, a large register transfer level (RTL) file for an application-specific integrated circuit (ASIC, e.g., an SoC) is mapped to multiple FPGAs and the ASIC is simulated at the "silicon level" (e.g., transistor and other device properties). In addition, emulation platforms have built-in debug infrastructure and may be used for early RTL validation. In contrast, traditional prototyping platforms have little to no debug infrastructure and are typically used for software development on late RTL that is close to "tape out." Accordingly, embodiments as disclosed herein include user-specified checkers in a non-intrusive way to augment debug capabilities of a multi-FPGA-based prototyping system. FPGA-based prototyping systems with enhanced debug capabilities as disclosed herein provide significant insight for a user into design functionality, without slowing down design performance (e.g., prototyping speed).

Embodiments as disclosed herein provide a robust debug infrastructure to FPGA based prototyping systems thereby reducing the time to set up the prototyping test. Even when a bug occurs in a late stage RTL run on the FPGAs prototyping unit, or in the related firmware, users may quickly isolate and identify the cause, with little impact in performance or productivity.

Some embodiments as disclosed herein provide a method for debugging firmware and verifying hardware in an SoC design with high accuracy and quick turnaround time. More specifically, embodiments as disclosed herein provide support for multiple user defined assertion checkers in a multi-FPGA prototyping system that avoids severe slowdowns when an error condition causes periodic state dumps in at least one of the FPGAs.

The disclosed system addresses a technical problem tied to computer technology and arising in the realm of computer simulation of hardware, namely the technical problem of accurately testing a SoC with a quick turnaround time. The disclosed system solves this technical problem by including a tracing capability that provides visibility to probe points in the testing process for dynamic debugging of a DUT with no loss of processing speed in a test.

The disclosure provides a scalable method to incorporate user-defined, "light weight" assertion events into an FPGA prototyping for a seemingly large DUT. Some embodiments include identifying the assertion checkers, or to incorporate the assertion checkers into the SoC design. In some embodiments, an FPGA prototyping system builds instrumentation logic to stop the SoC clocks upon any assertion events firing. The FPGA prototyping system may then turn control to a runtime system and call a user-registered handler function or a system function so the user may perform diagnostics and then resume the testing protocol.

In commonly used FPGA prototyping systems, state dumps, which are typically required for full prototyping visibility, are slow. This causes a slowdown in testing when periodic state dumps occur, substantially complicating and slowing down the debugging process in such systems. A solution consistent with embodiments disclosed herein is to provide the user an instrumentation logic and system compiler capabilities to detect an assertion event (e.g., for an error condition). When an assertion event is detected, some embodiments stop the FPGA clocks and pass control to the runtime system to call error handler functions for the user. Some embodiments may scale up to handle over 100,000 assertion checkers in a single DUT. Furthermore, in some embodiments the user involvement is substantially reduced to identify the assertion fire signals and either instantiate or "bind" the assertion instances, and to write a handler function to diagnose/correct issues.

Prototyping platforms consistent with the present disclosure may include a high level synthesis tool (HLS) converting a cycle-based simulation interface file to synthesizable register-transfer level (RTL) files, e.g., in Verilog RTL code. Synthesizable RTL files include standard logic cells like flip-flops and other standard cells ("OR," "NOT," "AND," "NOR," "NAND") used in Boolean logic calculations to be performed at a gate level in a digital circuit under a predetermined number of clock cycles (at least one).

FIG. 1 illustrates an architecture 10 including a multi-FPGA prototyping platform 100 for testing software and hardware in a DUT 120, according to some embodiments. Platform 100 provides the capability for inserting or activating multiple assertion checkers scattered across DUT 120. In some embodiments, the assertion checkers passively monitor user-indicated, failure signals. An assertion checker "firing" may cause the design to stop and provide information of the assertion that fired, together with additional telemetry data so that the user may quickly diagnose a problem. Platform 100 may include an integrated compile engine 101 having access to an ASIC RTL file 120 that includes DUT 120, and to debug probes 125. Debug probes 125 may include, inter-alia, trigger conditions files and other definitions useful to determine an assertion firing, or an error condition leading to the assertion firing.

Client host 102 includes a processor 12, configured to execute instructions stored in a memory 20. Memory 20 may include an application 22, which includes commands that when executed by processor 12 cause client host 102 to perform methods consistent with the present disclosure. Application 22 may include a runtime software program running on client host 102 to issue commands to control multi-FPGA prototyping platform 100. For example, application 22 may include an application to control a multi-FPGA prototyping platform 100 for DUT 120. DUT 120 may include a design for a SoC in an RTL compiler language (e.g., an ASIC RTL file). Client host 102 may also include a communications module 18 that enables client host 102 to transfer data, provide commands and receive instructions from multi-FPGA prototyping platform 100 through a network 104. Client host 102 may be coupled with an input device 14 (e.g., a mouse, a keyboard, a touch screen display, and the like) and to an output device 16 (e.g., a display, a speaker, and the like). Accordingly, a user of client host 102 may enter commands and queries to client host 102 with input device 14, and receive graphic and other information from client host 102 from output device 16.

Multi-FPGA prototyping platform 100 may include a processor 36 and a communications module 38 to transfer data, receive commands and provide instructions from client host 102 through network 104. An integrated compile engine 101 includes a memory compiler 103, a fast compiler (e.g., HDL-ICE) 105, and a debug inserter 107. In some embodiments, debug inserter 107 is configured to insert a debug probe into a stimulus waveform that will be propagated through multi-FPGA prototyping platform 100. Memory compiler 103 may include multi-FPGA compiler software that inserts pin multiplexing logic on the FPGA interconnect as desired. Integrated compile engine 101 loads a board file 109 and partitions DUT 120 into multiple sub-netlists in partitioning block 111, based on partition directives 113 (which may be provided manually or through a file). Partitioning block 111 may determine FPGA utilization balancing based on the partition of DUT 120 into the multiple sub-netlists. Partitioning block 111 may also determine interconnect optimization and automatic clock tree transformation between gated clocks, multiplexed clocks, latches, and the like, when partitioning DUT 120. Integrated compile engine 101 also includes a board router 115 and an FPGA place and route 117. In some embodiments, FPGA place and route 117 provides a fully automated capability that may support parallel place and route of multiple FPGA boards. FPGA place and route 117 may be fully integrated with routing software provided by a third party.

A database 130 for FPGA validation may include a verification model to validate an FPGA. A database 140 stores and provides FPGA bit files to boards FPGA 150-1 through **150-*n*, where 'n' is the number of FPGA boards available in multi-FPGA prototyping system 100 (hereinafter, collectively referred to as "FPGA boards 150"). Each one of FPGA boards 150 may be assigned a different sub-netlist from a partition of DUT 120. As a result of FPGA prototyping, waveforms of probes are stored in probe database 160. In some embodiments, FPGA validation 130 includes a facility to read back a state of a certain number of registers (e.g., Flip-flops) of FPGA 150**.

Each one of runtime clock controls 110-1 through **110-*n* (hereinafter, collectively referred to as "runtime clock controls 110") starts and stops the clocks of each FPGA board 150. In some embodiments, clock control 110 may return control to client host 102 when an assertion is fired. Accordingly, a user in client host 102 may perform a debug operation and start the clocks using clock control 110, once the assertion is addressed and removed. In some embodiments, clock control 110 issues a RUN_START and a RUN_STOP signal to prototyping platform 150. The RUN_START and RUN_STOP signals from clock control 110 may be asserted by client host 102 or internally, within the multi-FPGA prototyping platform 100 to start and stop the clocks of DUT 120. In some embodiments, in response to a RUN_STOP command, the control is handed to application 22 (i.e. "runtime application"). In some embodiments, multi-FPGA prototyping platform 100 may provide a notification to the user as to why the run was stopped, thus enabling the user to perform any actions on the command line of application 22** to resolve or debug any assertions that were fired.

Architecture 10 improves performance of multi-FPGA prototyping platform 100 without compromising on speed. Some embodiments include a triangulation scheme for multiple assertions to enable the user to determine a root cause of a problem and set up the prototyping system for operation with minimal delays.

Figure 2:
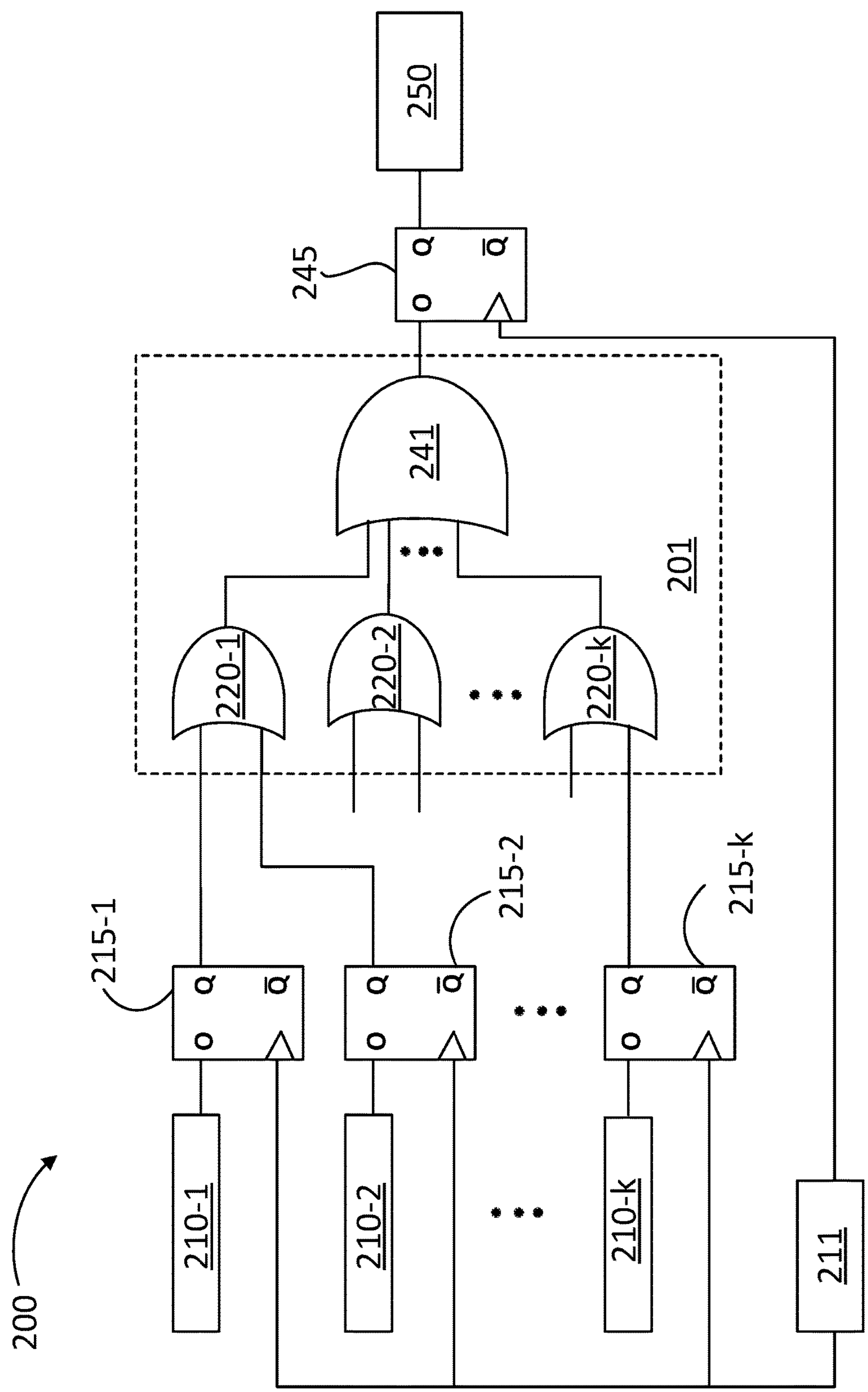
FIG. 2 illustrates an instrument checker in an FPGA from a prototyping platform, according to some embodiments.

FIG. 2 illustrates an instrument checker 200 in an FPGA board 150 from a prototyping platform (e.g., multi-FPGA prototyping platform 100), according to some embodiments. Instrument checker 200 may include multiple conditions: 210-1, 210-2, . . . , through **210-*k* (hereinafter, collectively referred to as conditions 210) in as many instances of a user-defined assertion. Flip-flops 215-1, 215-2 through 215-*k* (hereinafter, collectively referred to as "flip-flops 215") receive a bit corresponding to the state of each of conditions 210**.

A multilevel OR tree 201 includes a first layer of OR operators 220-1, 220-2, through **220-*k* (hereinafter referred to as "OR operators 220"), and a second layer of OR operators 241 (only one OR operator 241 shown for simplicity). In some embodiments, OR operators 220 receive signals from a pair of flip-flops 215. For example, OR operator 220-1 may be configured to receive a signal from flip-flop 215-1 and flip-flop 215-2, associated with different instances of the user-defined assertion within the same board FPGA 150**.

A flip-flop 245 releases a per-FPGA signal 250, synchronized with a clock 211. Clock 211 also provides clock signals for flip-flops 215. Accordingly, any one of conditions 210 that indicate a fired assertion will trigger a high state in per-FPGA signal 250, indicating that one of the assertions 1 through k has been fired within two clock cycles of clock 211, for a specific FPGA board. When per-FPGA signal 250 is high, a clock control module (e.g., clock control 110) stops clock 211. In some embodiments, clock 211 is desirably faster than clocks in DUT 120.

Figure 3:
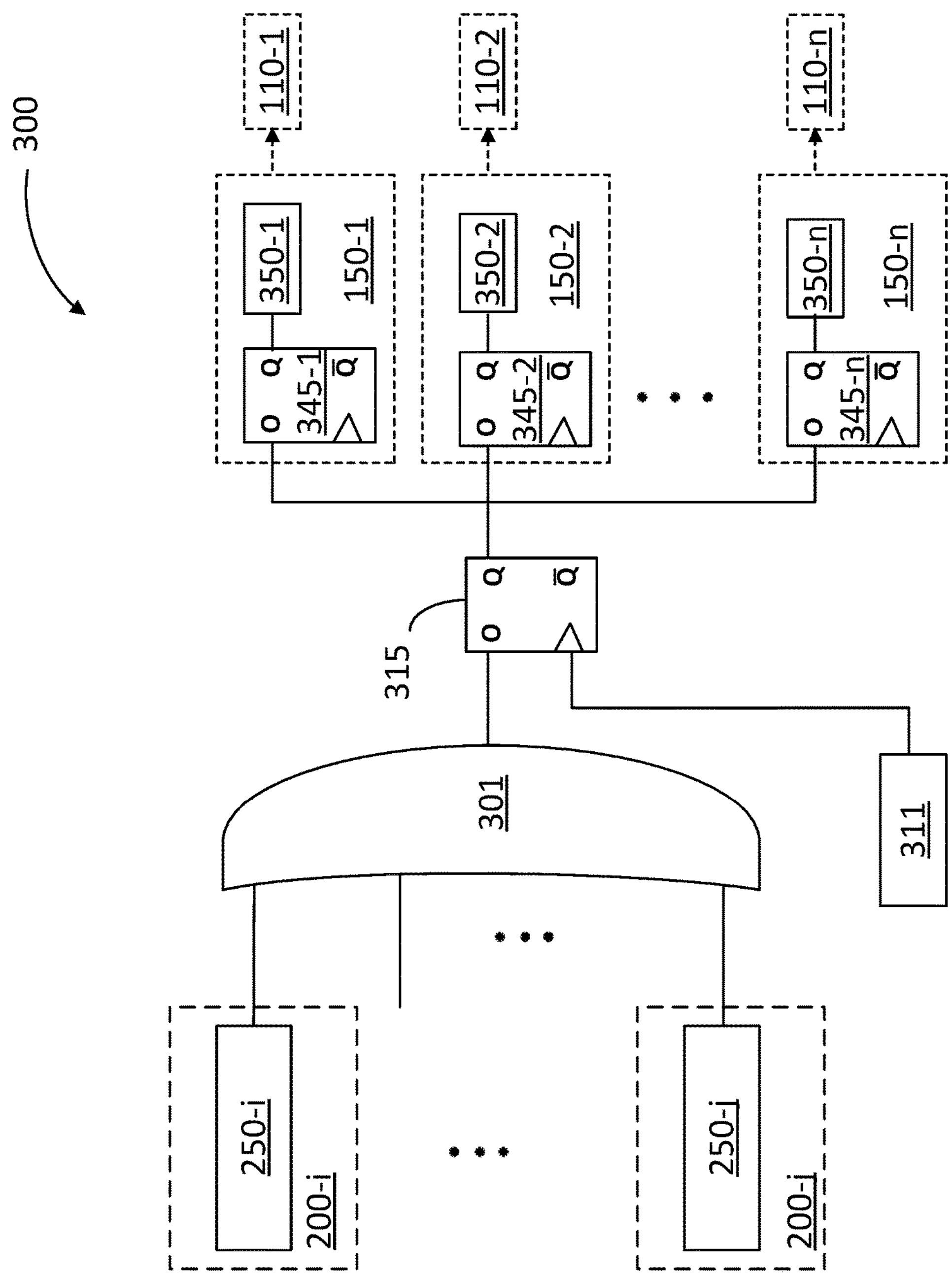
FIG. 3 illustrates a fan-out network for driving individual FPGA clock modules in a prototyping platform, according to some embodiments.

FIG. 3 illustrates a fan-out network 300 for driving individual FPGA checkers **200-*i* through 200-*j* (e.g., checker 200, where i and j may be any integer value between 1 and n) in a prototyping platform (e.g., multi-FPGA prototyping platform 100), according to some embodiments. In fan-out network 300, a global OR gate 301 includes an output flip-flop 315 that receives signals 250-*i* and 250-*j* within one clock cycle from a clock 311. In some embodiments, global OR gate 301 includes a synchronization step for time-division-multiplexing (TDM) pin multiplexing (e.g., "muxing"). Accordingly, clock 311 may be synchronous with clock 211. In some embodiments, clock 311 may include or be the same as clock 211. Flip-flop 315 provides a FIRED signal broadcast that is synchronized to clock 311 as long as any one of flops 200-*i* through 200-*j* reports an assertion FIRE signal 250**.

Fan-out network 300 includes multiple output flip-flop stages 345-1, 345-2, through **345-*n* (hereinafter, collectively referred to as "output flip-flops 345," one for each of FPGA boards 150) to receive the FIRED signal broadcast from flip-flop 315 within a cycle from clock 311. Each clock control module 110 receives the FIRED signal at the same time as flip-flops 345 are on a synchronous path to a RUN-STOP signal 350-1, 350-2 through 350-*n* (hereinafter, collectively referred to as "RUN_STOP signals 350") respectively. In some embodiments, setup and hold timing constraints are met by careful selection of clocks 211, 311, and synchronization of global OR gate 301. Accordingly, within a few clock cycles of the fast checker clock (e.g., clock 211 or clock 311), all FPGAs come to a stop at the same time and transfer control to client host 102. In some embodiments, a synchronization mechanism consistent with fan-out network 300** may be extended to other applications and is not limited to assertion checkers.

Figure 4:
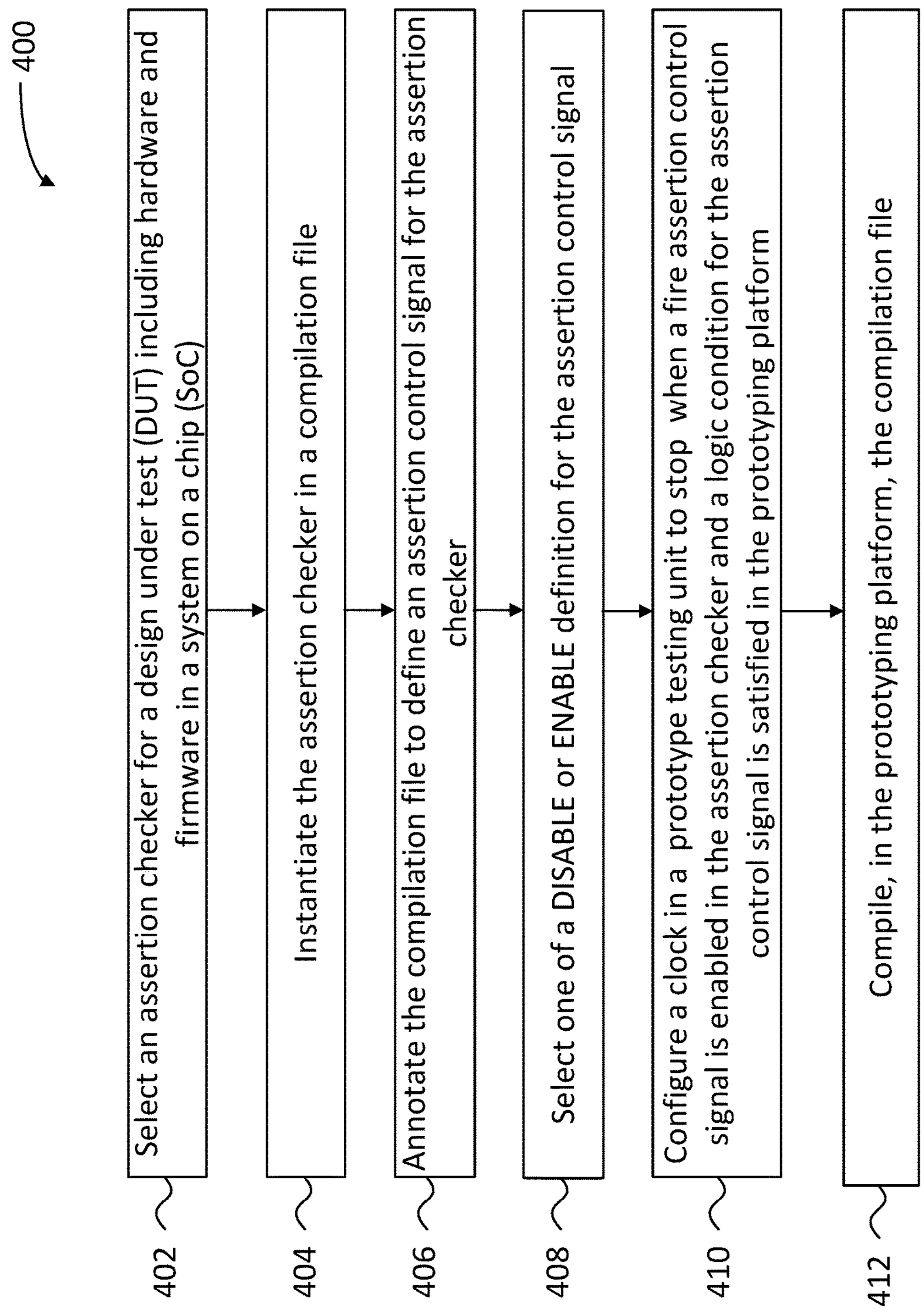
FIG. 4 is a flow chart illustrating steps in a method for supporting multiple user-specified assertion checkers in a prototyping platform, according to some embodiments.

FIG. 4 is a flow chart illustrating steps in a method 400 for supporting multiple user-specified assertion checkers in a prototyping platform (e.g., multi-FPGA prototyping platform 100), according to some embodiments. In some embodiments, at least one or more of the steps in method 400 may be performed by a processor configured to execute instructions stored in a memory of a computer (e.g., processors 12 and 36, and memories 20 and 40). Accordingly, in some embodiments a method may include at least one or more steps in method 400 partially performed by a client host (e.g., client host 102), and at least one or more steps in method 400 partially performed by the prototyping platform. A user with access to the client host may provide a DUT to the prototyping platform (e.g., DUT 120). The DUT may be an RTL file for a SoC including firmware and hardware components. The user may also provide debug probes to, and retrieve probe waveforms from, the prototyping system (e.g., debug probes 125, and probe waveforms 140). Further, the DUT may be partitioned into a plurality of sub-netlists, wherein each sub-netlist is processed by a single FPGA board in the prototyping platform (e.g., FPGA boards 150).

At least some of the steps in method 400 may be performed by a computer having a processor executing commands stored in a memory of the computer. Further, steps as disclosed in method 400 may include retrieving, editing, and/or storing files in a database that is part of, or is communicably coupled to, the computer. Methods consistent with the present disclosure may include at least some, but not all of the steps illustrated in method 400, performed in a different sequence. Furthermore, methods consistent with the present disclosure may include at least two or more steps as in method 400, performed overlapping in time, or almost simultaneously.

In some embodiments, at least one or more of the steps in method 400 may be performed in a cloud computing environment, wherein a computer may include servers, such as a master server and a slave server. Accordingly, at least some of the steps illustrated in method 400 may be performed in parallel in different processors, following separate computational threads. For example, each of the separate computational threads may be performed by at least one of slave servers in each of multiple applications and processors dedicated to the specific computational thread.

Step 402 includes selecting an assertion checker for the DUT (e.g., the SoC). In some embodiments, step 402 includes selecting an assertion checker to be "active" from multiple assert modules. The selected assert module may include multiple instances (e.g., 100,000 instances, or even more) scattered across a DUT hierarchy.

Step 404 includes instantiating the assertion checker in a compilation file. The compilation file may include a Register Transfer Level (RTL) file, and step 404 may include compiling the RTL file in the prototyping platform. In some embodiments, step 404 includes incorporating the assertion checker as an instance in the RTL file for the prototyping platform. In some embodiments, step 404 may include instantiating the assertion checker with an implementation of the SystemVerilog "bind" language construct. Accordingly, step 404 may include adding the assertion checker in a non-intrusive way, e.g., without altering the DUT. In some embodiments, step 404 may include letting the user communicate the assertion checker's key control signals to the compilation software via pragma annotations on the assertion module's source as follows:

"

```
// pragma CVAPROP MOD "ASSERTION_MOD"
// pragma CVAPROP ASSERT_NET "fired_port"
// pragma CVAPROP ASSERT_ENABLE "enable_port"
// pragma CVAPROP "rstn|active_low"
// pragma CVAPROP ASSERT_CLK "clk"
module assert2(input fired_port, input enable_port, input rstn, input clk, . . . )
```

"

Where "fired_port" is the "Fired Net" and "enable_port" is used to enable or disable this "Fired Net". In some embodiments, step 404 includes incorporating bind or normal instantiations to the selected assertion checker to have multiple instances of this IP in the DUT. In some embodiments, step 404 includes adding an optional command to a Verilog compiler to select an assert block as in "compilerOption {assertBlock assert2}." This optional command may enable an "import" operation to iterate through all assert module instances specified by the above pragma and point the definition to "assert2" instead of, say, assert1. Step 404 includes adding to a library all, or almost all, the assert block definitions, so that they are available for the multiple FPGA's sunning the prototyping operation.

Step 406 includes annotating the compilation file to define an assertion control signal for the assertion checker. In some embodiments, step 406 includes providing a definition of an assertion control signal in the assertion checker through annotations in the RTL file. For example, in some embodiments step 406 includes annotating the ports of interest on a Verilog module as HDL Verilog pragmas to a CAD software.

Step 408 includes selecting one of a DISABLE or ENABLE definitions for the assertion control signal. In some embodiments, step 402 may include enclosing a FIRED signal assertion in the context of a user-interesting event. Further, step 402 may include configuring the ENABLE signal (e.g., via a global force/release) to disable the assertion checker. In some embodiments, step 408 includes addressing, in the selected assert module, specific single bit ports of interest such as FIRED, ENABLE, RESET and other optional ports such as clocks, and the like.

Step 410 includes configuring a clock in a prototyping platform to stop when the assertion control signal is enabled in the assertion checker and a logic condition for the assertion control signal is satisfied in the prototyping platform. In some embodiments, step 410 includes configuring a clock in a prototype testing unit to stop when a fire assertion control signal is enabled in the assertion checker and the fire assertion control signal is satisfied by a logic condition of at least one FPGA in the prototype testing unit.

In some embodiments, when a DUT design RTL is read into the compilation system and the different sub-netlists are linked together, step 410 may include providing an instance tree of the DUT to the compiler. In some embodiments, step 410 may be at least partially performed by a language parser software, such as a commercially available parser from Verific Design Automation in Alameda, Calif.

Step 412 includes compiling, in the prototyping platform, the compilation file.

Figure 5:
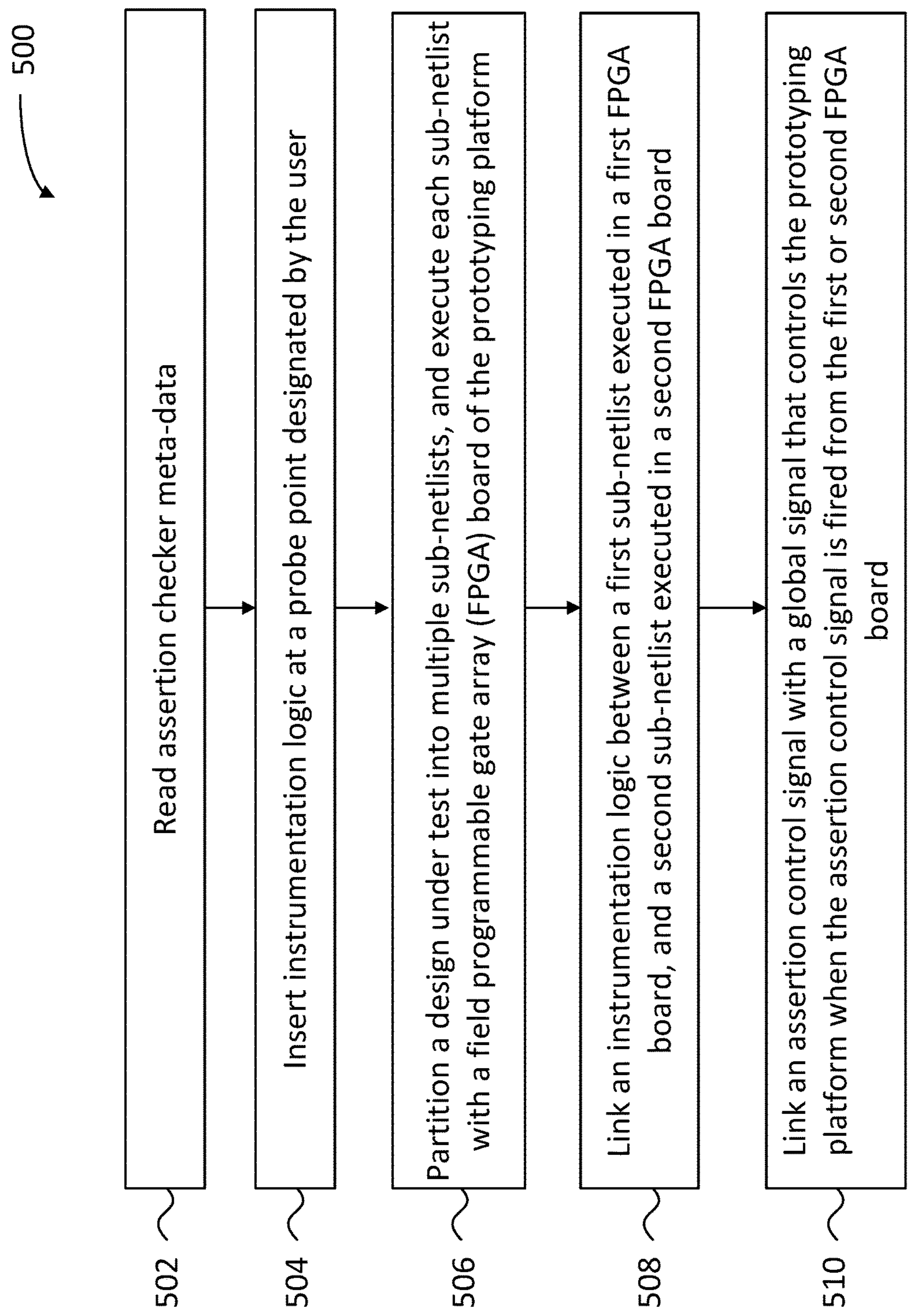
FIG. 5 is a flow chart illustrating steps in a method for compiling instructions including multiple user-specified assertion checkers for a prototyping platform, according to some embodiments.

FIG. 5 is a flow chart illustrating steps in a method 500 for compiling instructions including multiple user-specified assertion checkers for a prototyping platform (e.g., multi-FPGA prototyping platform 100), according to some embodiments. In some embodiments, at least one or more of the steps in method 500 may be performed by a processor configured to execute instructions stored in a memory of a computer (e.g., processors 12 and 36, and memories 20 and 40). Accordingly, in some embodiments a method may include at least one or more steps in method 500 partially performed by a client host (e.g., client host 102), and at least one or more steps in method 500 partially performed by the prototyping platform. A user with access to the client host may provide a DUT to the prototyping platform (e.g., DUT 120). The DUT may be an RTL file for a SoC including firmware and hardware components. The user may also provide debug probes to, and retrieve probe waveforms from, the prototyping system (e.g., debug probes 125, and probe waveforms 140). Further, the DUT may be partitioned into a plurality of sub-netlists, wherein each sub-netlist is processed by a single FPGA board in the prototyping platform (e.g., FPGA boards 150).

At least some of the steps in method 500 may be performed by a computer having a processor executing commands stored in a memory of the computer. Further, steps as disclosed in method 500 may include retrieving, editing, and/or storing files in a database that is part of, or is communicably coupled to, the computer. Methods consistent with the present disclosure may include at least some, but not all of the steps illustrated in method 500, performed in a different sequence. Furthermore, methods consistent with the present disclosure may include at least two or more steps as in method 500, performed overlapping in time, or almost simultaneously.

In some embodiments, at least one or more of the steps in method 500 may be performed in a cloud computing environment, wherein a computer may include servers, such as a master server and a slave server. Accordingly, at least some of the steps illustrated in method 500 may be performed in parallel in different processors, following separate computational threads. For example, each of the separate computational threads may be performed by at least one of slave servers in each of multiple applications and processors dedicated to the specific computational thread.

Step 502 includes reading the assertion-checker metadata. In some embodiments, step 502 includes determining an address or a location of a debug probe associated with the assertion-checker, in the memory or in an external database.

Step 504 includes inserting instrumentation logic at a probe point designated by the user. In some embodiments, step 504 includes inserting instrumentation such as a flip-flop that flip-flops a "FIRED" signal for an assertion checker (e.g., OR operators 220 in checker 200, and global OR gate 301 in fan-out network 300).

In some embodiments, step 504 may include annotating a disconnected Q-PIN output in a flip flop (e.g., flip-flop 245) as "DO_NOT_TOUCH" or "PRESERVE" for the compiler (e.g., the Verilog compiler). Accordingly, step 504 may include preventing the compiler from deleting disconnected flops that may be used in a global OR gate at a subsequent logic stage. Further, in some embodiments step 504 includes tracking, with the compiler, the instrumented checkers.

Step 506 includes partitioning the DUT into multiple sub-netlists, and executing each sub-netlist with an FPGA board of the prototyping platform. Accordingly, step 506 simplifies and accelerates the prototyping of the DUT. In some embodiments, step 506 includes verifying that the resource constraints of each of the multiple FPGAs are met by the partition. Some of the resource constraints may include a number of look-up tables (LUTS), flip-flops (e.g., flip-flops 215, 245, 315 and 345), and the like. Step 506 may also include verifying and optimizing the cuts and couplings between the different FPGAs, and optimizing other FPGA performance metrics. In some embodiments, step 506 includes verifying that each part of the SoC design partition fits individual FPGA resource constraints.

In some embodiments, step 506 may include optimizing the partition of the DUT including the assertion-checkers resource constraints. Thus in some embodiments step 506 includes preventing the assertion-checkers from overflowing a single FPGA's resource constraint. Further, step 506 includes preventing the instrumentation logic network from playing a role in partitioning the DUT. Accordingly, step 506 includes reducing the adverse influence of design performance (e.g., speed to completion) or other metrics in the DUT partition.

Step 508 includes linking the instrumentation logic between a first sub-netlist executed in a first FPGA board and a second sub-netlist executed in a second FPGA board. In some embodiments, step 508 includes stitching the instrumentation logic between all FPGAs, to complete the DUT test. In some embodiments, step 508 may include forming a set, S, of instrument checkers for the first or second FPGA partition, and constructing an OR tree whose inputs are the outputs of the set, S (e.g., instrument checker 200). Further, in some embodiments, step 508 includes inserting a flip-flop, 'R', at the output of the OR tree (e.g., flip-flops 345).

Step 510 includes linking an assertion control signal with a global signal that controls the prototyping platform when the assertion control signal is fired from the first or second FPGA board executing a sub-netlist of the DUT in the prototyping platform. More generally, step 510 includes. In some embodiments, step 510 includes forming a set, F, of FPGA-FIRED signals collected from each FPGA in the prototyping system. Further, in some embodiments, step 510 includes inserting a final OR tree whose inputs are the signals in the set, F (e.g., fan-out network 300 and global OR gate 301). In some embodiments, step 510 may include terminating the OR tree with a register, R (e.g., flip-flops 345). In some embodiments, step 510 may include tying the output of register R to "N" registers, where N is the number of active FPGA clock control modules. Further, step 510 may include coupling each of the N register outputs to a run-stop signals to the clock control modules (e.g., one of run-stop signals 350 to clock control modules 110).

In some embodiments, step 510 may also include adding the newly introduced sub-nets to the partition cut set, e.g., the set of nets that are between the first and second FPGAs. Accordingly, step 510 may include adding about, F, input nets from the, N, FPGAs into a single OR tree (e.g., global OR gate 301). Step 510 may further include adding N fan-out nets, with each net going to a register that drives the individual clock control module. Typically, N=F.

In some embodiments, clock control modules 110 are configured to stop all clocks in the system and hands control to the host system, which may resolve the issue rose by the assertion checker manually or automatically.

Figure 6:
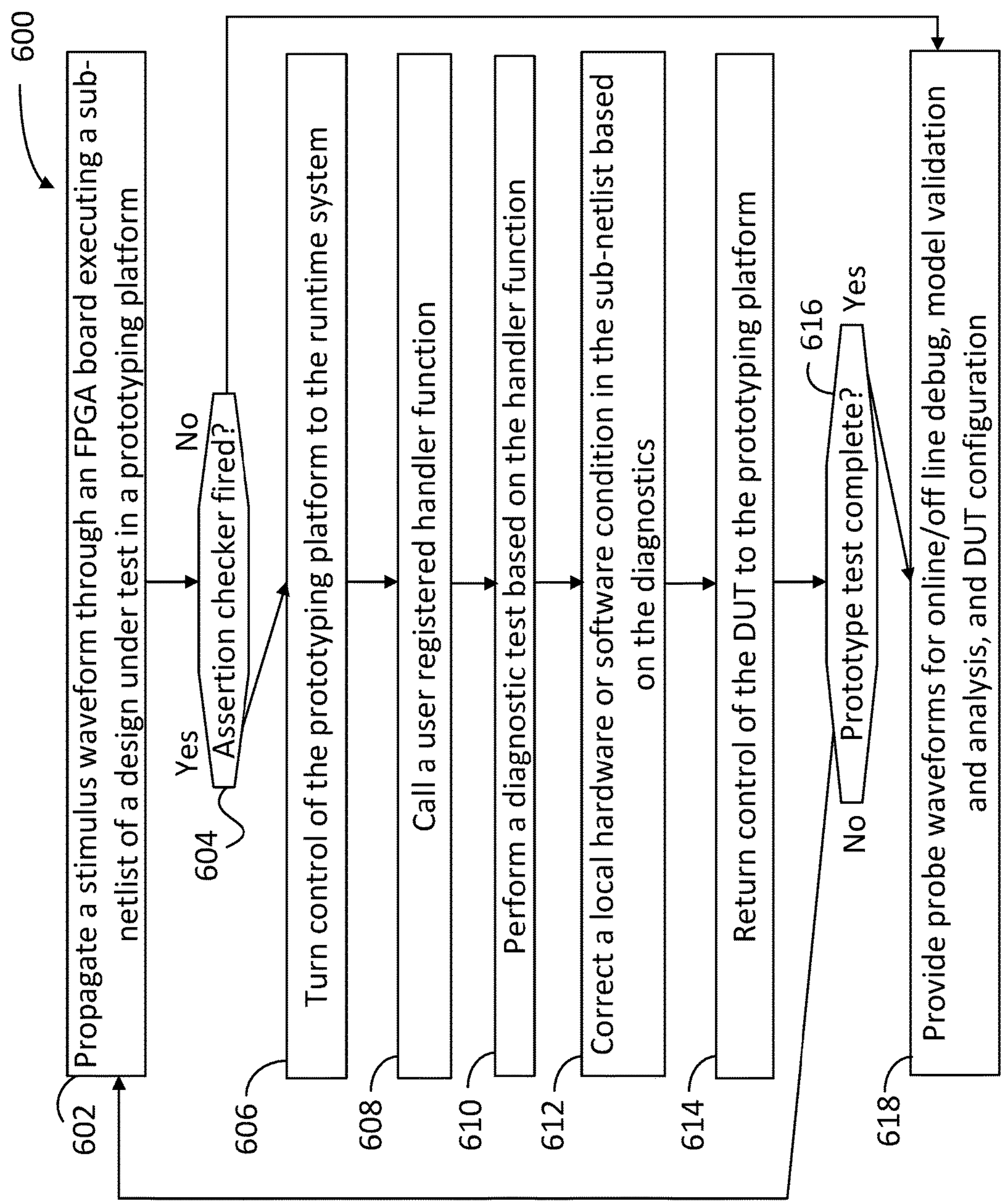
FIG. 6 is a flow chart illustrating steps in a method for prototyping a DUT with multiple user-specified assertion checkers, according to some embodiments.

FIG. 6 is a flow chart illustrating steps in a method 600 for prototyping a DUT with multiple user-specified assertion checkers in a prototyping platform (e.g., multi-FPGA prototyping platform 100), according to some embodiments. In some embodiments, at least one or more of the steps in method 600 may be performed by a processor configured to execute instructions stored in a memory of a computer (e.g., processors 12 and 36, and memories 20 and 40). Accordingly, in some embodiments a method may include at least one or more steps in method 600 partially performed by a runtime system (e.g., client host 102), and at least one or more steps in method 600 partially performed by the prototyping platform. A user with access to the runtime system may provide a DUT to the prototyping platform (e.g., DUT 120). The DUT may be an RTL file for a SoC including firmware and hardware components. The user may also provide debug probes to, and retrieve probe waveforms from, the prototyping system (e.g., debug probes 125, and probe waveforms 140). Further, the DUT may be partitioned into a plurality of sub-netlists, wherein each sub-netlist is processed by a single FPGA board in the prototyping platform (e.g., FPGA boards 150).

At least some of the steps in method 600 may be performed by a computer having a processor executing commands stored in a memory of the computer. Further, steps as disclosed in method 600 may include retrieving, editing, and/or storing files in a database that is part of, or is communicably coupled to, the computer. Methods consistent with the present disclosure may include at least some, but not all of the steps illustrated in method 600, performed in a different sequence. Furthermore, methods consistent with the present disclosure may include at least two or more steps as in method 600, performed overlapping in time, or almost simultaneously.

In some embodiments, at least one or more of the steps in method 600 may be performed in a cloud computing environment, wherein a computer may include servers, such as a master server and a slave server. Accordingly, at least some of the steps illustrated in method 600 may be performed in parallel in different processors, following separate computational threads. For example, each of the separate computational threads may be performed by at least one of slave servers in each of multiple applications and processors dedicated to the specific computational thread.

Step 602 includes propagating a stimulus waveform through one of the FPGA boards in the prototyping platform.

Step 604 includes verifying whether an assertion checker has been fired. In some embodiments, step 604 is performed with an instrument checker configured to provide a fire signal to the at least one processor when a logic condition for the assertion checker is satisfied by the stimulus waveform in the field programmable gate array board (e.g., instrument checker 200).

When step 604 determines that an assertion checker has not been fired, then step 618 includes providing waveforms for online/offline debug, model validation and analysis, and DUT configuration. When step 604 determines that an assertion checker has been fired, step 606 includes turning control of the prototype platform to the runtime system (e.g., the client host).

Step 608 includes calling a user registered handler function (e.g., from the runtime system). In some embodiments, step 608 includes registering a runtime handler in the compiler. For example, in some embodiments step 608 includes specifying, by the user, a tool command language (TCL) procedure, and a path to the TCL script through a line in the compiler, as follows:

CompilerOption -add {assertionProc myProc "/path/to/my/proc.tcl"}

The above TCL procedure is then registered during the start of the runtime, and called after trigger during runtime. In some embodiments, runtime handlers may be more generally referred to as call-back functions. In some embodiments, step 608 includes registering a TCL procedure configured to be called when an assertion checker is fired, thus returning control of the DUT from the prototyping platform to the runtime system.

In some embodiments, step 608 includes performing multiple operations within the TCL procedure, such as, but not limited to: reading multiple state registers, dumping memory values from the registers, resetting one or more assertion checkers, and restarting the DUT prototyping. In some embodiments, step 608 may include using state read-back facilities provided by the prototyping system to inform the user on which assertion checkers fired.

Step 610 includes performing a diagnostic test based on the handler function. In some embodiments, step 610 may include performing, by the runtime system, at least some of the instructions in the TCL procedure.

Step 612 includes correcting a local hardware or software condition in the DUT based on the diagnostics.

Step 614 includes returning control of the DUT to the prototype testing unit.

Step 616 includes verifying whether the DUT prototyping is complete. In some embodiments, step 616 may include verifying that all, most of all, or a selected number of FPGA boards have been activated with at least a stimulus waveform. In some embodiments, step 616 may include verifying that all sub-netlists in the DUT partitions have been tested.

When step 616 determines that the prototyping is not complete, method 600 returns to step 602 to propagate a new stimulus waveform through a new FPGA board in the prototyping platform. When step 616 determines that the prototyping is complete, method 600 proceeds to step 618, as described above.

Figure 7:
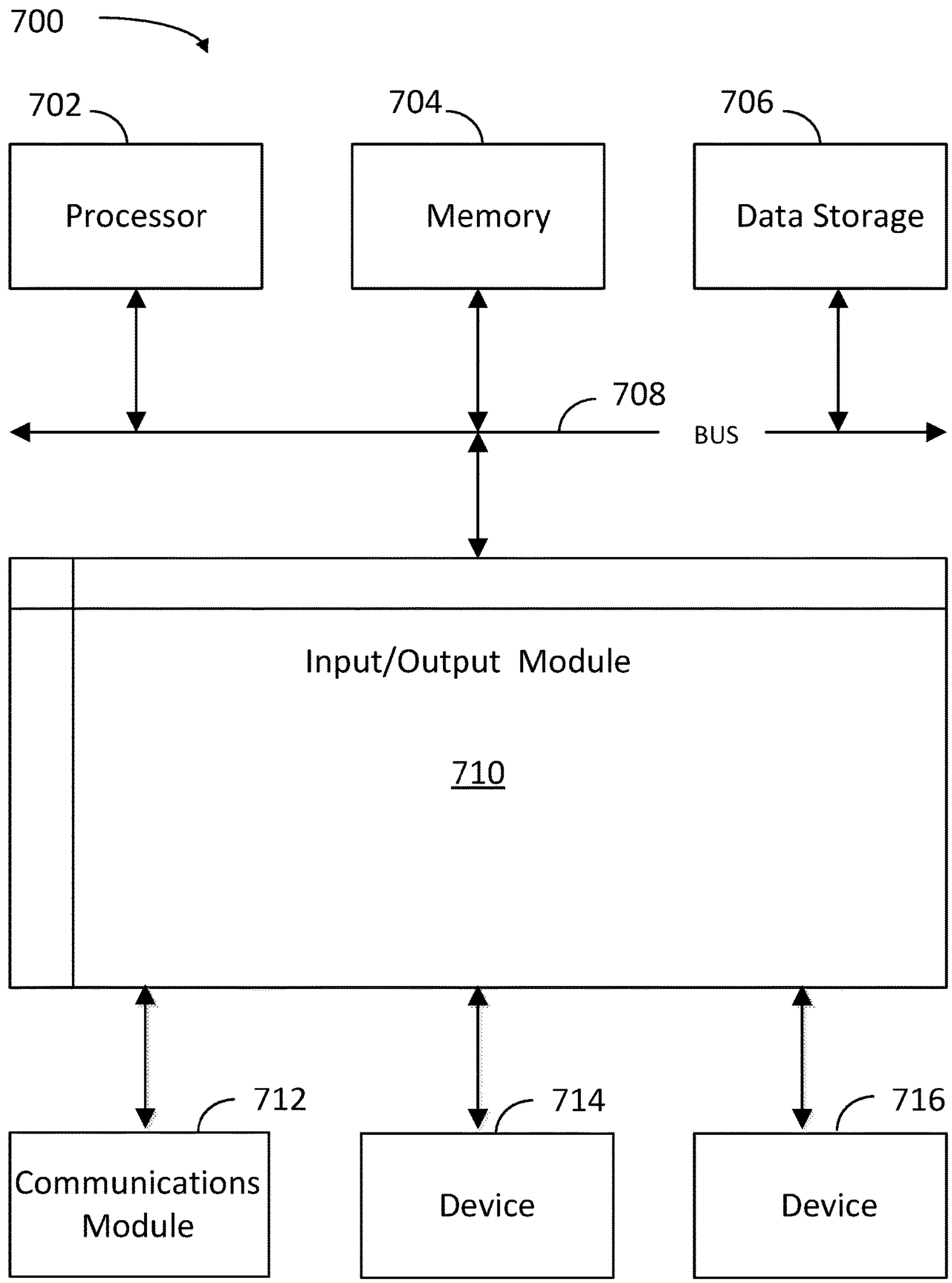
FIG. 7 is a block diagram illustrating an example computer system for prototyping a design under test for a SoC, according to some embodiments.

FIG. 7 is a block diagram illustrating an example computer system 700 with which the methods and steps illustrated in methods 400, 500 and 600 can be implemented, according to some embodiments. In certain aspects, computer system 700 can be implemented using hardware or a combination of software and hardware, either in a dedicated server, integrated into another entity, or distributed across multiple entities.

Computer system 700 includes a bus 708 or other communication mechanism for communicating information, and a processor 702 coupled with bus 708 for processing information. By way of example, computer system 700 can be implemented with one or more processors 702. Processor 702 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 702 may include modules and circuits configured as a 'placing' tool or engine, or a 'routing' tool or engine, to place devices and route channels in a circuit layout, respectively and as disclosed herein.

Computer system 700 includes, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. Processor 702 and memory 704 can be supplemented by, or incorporated in, special purpose logic circuitry.

The instructions may be stored in memory 704 and implemented in one or more computer program products, e.g., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions.

Computer system 700 is coupled via input/output module 710 to various devices. The input/output module 710 is any input/output module. Example input/output modules 710 include data ports such as USB ports. The input/output module 710 is configured to connect to a communications module 712. Example communications modules 712 include networking interface cards, such as Ethernet cards and modems. In certain aspects, the input/output module 710 is configured to connect to a plurality of devices, such as an input device 714 and/or an output device 716. Example input devices 714 include a keyboard and a pointing device, e.g., a mouse or a trackball, by which a user can provide input to the computer system 700. Other kinds of input devices 714 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 716 include display devices, such as a LED (light emitting diode), CRT (cathode ray tube), or LCD (liquid crystal display) screen, for displaying information to the user.

Methods as disclosed herein may be performed by computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein (e.g., as in methods, 400, 500 and 600). One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 700 includes servers and personal computer devices. A personal computing device and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a personal digital assistant (PDA), a mobile audio player, a Global Positioning System (GPS) receiver, a video game console, and/or a television set top box.

The term “machine-readable storage medium” or “computer readable medium” as used herein refers to any medium or media that participates in providing instructions or data to processor 702 for execution. Such a medium may take many forms, including, but not limited to, non-volatile media, volatile media, and transmission media. Non-volatile media include, for example, optical disks, magnetic disks, or flash memory, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one aspect, a term field effect transistor (FET) may refer to any of a variety of multi-terminal transistors generally operating on the principals of controlling an electric field to control the shape and hence the conductivity of a channel of one type of charge carrier in a semiconductor material, including, but not limited to a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:

selecting, using a computer, an assertion checker for a design under test, the design under test comprising hardware and firmware for a system on a chip;

instantiating, using the computer, the assertion checker in a compilation file;

annotating, using the computer, the compilation file to define an assertion control signal for the assertion checker;

selecting, using the computer, one of a DISABLE or an ENABLE definition for the assertion control signal defined in the compilation file; and configuring, using the computer, a clock in a prototyping platform to stop when the assertion control signal is enabled in the assertion checker and a logic condition for the assertion control signal is satisfied in the prototyping platform.

2. The computer-implemented method of claim 1, wherein the compilation file is a register transfer level file, and the computer-implemented method further comprises compiling, using the computer, the register transfer level file in the prototyping platform.

3. The computer-implemented method of claim 1, wherein selecting an assertion checker for a design under test comprises reading a meta-data indicating a location of a debug probe associated with the assertion checker.

4. The computer-implemented method of claim 1, wherein annotating the compilation file comprises inserting instrumentation logic at a probe point designated by a user.

5. The computer-implemented method of claim 1, wherein the prototyping platform comprises multiple field programmable gate array boards, the method further comprising, using the computer, partitioning the design under test into multiple sub-netlists, and executing at least one sub-netlist with a field programmable gate array board.

6. The computer-implemented method of claim 1, wherein annotating the compilation file to define an assertion control signal for the assertion checker comprises linking an instrumentation logic between a first partition of the design under test executed in a first field programmable gate array board and a second partition of the design under test executed in a second field programmable gate array board.

7. The computer-implemented method of claim 1, wherein annotating the compilation file to define an assertion control signal for the assertion checker comprises linking the assertion control signal with a global signal that controls the prototyping platform when the assertion control signal is fired from at least one of multiple field programmable field array boards executing a sub-netlist of the design under test in the prototyping platform.

8. The computer-implemented method of claim 1, wherein configuring the clock in a prototyping platform to stop when the assertion control signal is enabled comprises synchronizing multiple flip-flops associated with multiple assertion control signals with the clock.

9. The computer-implemented method of claim 1, wherein configuring the clock in a prototyping platform to stop when the assertion control signal is enabled comprises synchronizing, with the clock, a global OR gate that multiplexes a plurality of flip-flops from multiple field programmable array boards, and wherein at least one of the plurality of flip-flops is configured to signal a firing of the assertion checker.

10. The computer-implemented method of claim 1, further comprising configuring, using the computer, the prototyping platform to release a control of the design under test to a client host when the logic condition for the assertion control signal is satisfied.

* * * * *